United States Patent [19]

Grant et al.

[11] Patent Number: 5,142,661
[45] Date of Patent: Aug. 25, 1992

[54] FIBER OPTIC CABLE SPLICE SUPPORT AND ROUTING GUIDE

[75] Inventors: William D. Grant, Peoria, Ariz.; Henry K. Baum, Boynton Beach, Fla.

[73] Assignee: Siemens Aktiengesellschaft, Berlin and Munich, Fed. Rep. of Germany

[21] Appl. No.: 619,790

[22] Filed: Nov. 29, 1990

[51] Int. Cl.⁵ .............................................. G02B 6/36
[52] U.S. Cl. .................................................. 385/135
[58] Field of Search ............... 350/96.20, 96.21, 96.22, 350/96.23; 385/135

[56] References Cited

FOREIGN PATENT DOCUMENTS

| | | | |
|---|---|---|---|
| 281196 | 9/1988 | European Pat. Off. | 350/96.23 |
| 3843192 | 6/1990 | Fed. Rep. of Germany | 350/96.20 |
| 45053 | 3/1980 | Japan | 350/96.21 |
| 192009 | 11/1983 | Japan | 350/96.20 |
| 223112 | 12/1983 | Japan | 350/96.20 |
| 2176907 | 1/1987 | United Kingdom | 350/96.23 |
| 8900783 | 1/1989 | World Int. Prop. O. | 350/96.20 |

Primary Examiner—Frank Gonzalez
Attorney, Agent, or Firm—Joseph S. Codispoti

[57] ABSTRACT

A unitary optical fiber splice support and routing guide insuring that at least a minimum bending radius is maintained for the fiber and allowing for a flexible routing pattern which stores on the device a wide range of fiber lengths.

9 Claims, 1 Drawing Sheet

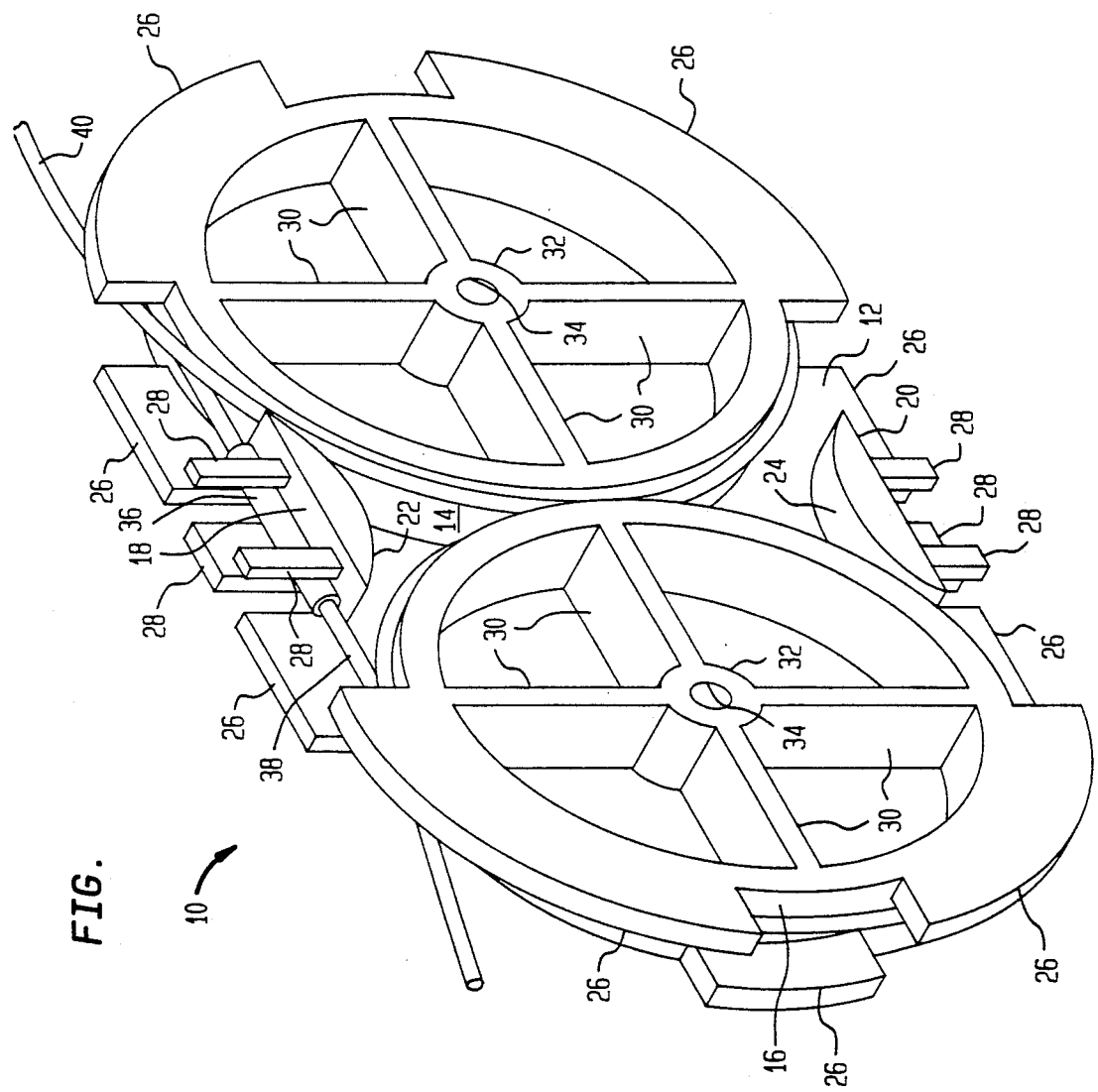

FIBER OPTIC CABLE SPLICE SUPPORT AND ROUTING GUIDE

BACKGROUND OF THE INVENTION

This invention relates to fiber optic cables and, more particularly, to a device for supporting optical fiber splices and managing excess lengths of fiber connected thereto.

It is conventional for a vendor of optical equipment, such as lasers and optical receivers, to provide an optical cable stub from the equipment enclosure. This stub provides optical access to the equipment without requiring the end user to open the enclosure. Typically, such stub is a three foot length of optical quality fiber. This fiber stub must be spliced to some other fiber to provide an optical communication path to other equipment. Typically, only about six inches out of the three feet of optical fiber is actually needed to make the connection. However, it is undesirable to trim the excess from the stub in the event that a mistake is made and/or the splice must be redone.

Optical fibers are delicate and must be handled properly. One requirement when handling such fibers is that any change of direction of the fiber cannot be any sharper than a minimum bend radius specified by the manufacturer. A typical specified minimum bend radius is on the order of one inch.

Splicing of optical fibers is typically accomplished by providing a splice cylinder approximately two inches long and having a diameter about three times the diameter of the optical fiber. This cylinder has an axial bore sized to allow a pair of optical fibers, one from either end, to be snugly inserted therein. The ends of these fibers have previously been appropriately machined and then an optical welding operation is effected. The region where the fiber leaves the splice cylinder is particularly susceptible to bending at a radius less than the specified minimum bend radius. Therefore, the splice cylinder, along with the fiber closely adjacent thereto, needs to be properly supported.

It is therefore a primary object of this invention to provide a device which supports an optical fiber splice and allows for the routing of the optical fiber while maintaining the specified minimum bend radius.

It is another object of this invention to provide such a device wherein the routing pattern may be varied so as to accommodate various lengths of fiber.

SUMMARY OF THE INVENTION

The foregoing, and additional, objects are attained in accordance with the principles of this invention by providing an optical fiber splice support and routing guide comprising a planar backing plate, a plurality of fiber guide surfaces perpendicular to the backing plate, each of the guide surfaces being configured so that a fiber supported thereon is maintained with a bend radius greater than a predetermined minimum radius, and splice support means for removably engaging and supporting a splice between the supported fiber and another fiber.

BRIEF DESCRIPTION OF THE DRAWINGS

The foregoing will be more readily apparent upon reading the following description in conjunction with the drawing in which the single FIGURE illustrates a unitary optical fiber splice support and routing guide constructed in accordance with the principles of this invention.

DETAILED DESCRIPTION

Referring now to the drawing, the exemplary device 10 is a unitary device, preferably molded of plastic, which both supports optical fiber splices and allows for the routing of optical fibers while maintaining the specified minimum bend radius therefor. The device 10 includes a planar backing plate 12 on which are supported a plurality of fiber guide surfaces and splice support means.

The guide surfaces include a first cylindrical surface 14 and a second cylindrical surface 16 which are perpendicular to the plate 12. These cylindrical surfaces 14, 16 have radii which are at least as great as the specified minimum bend radius. Thus, for a minimum bend radius of one inch, the cylindrical surfaces 14, 16 may have diameters of about 2.5 inches.

To support the splice, there is provided a splice support surface 18 which defines a segment of a plane which is tangential to both the cylindrical surfaces 14 and 16. A second splice support surface 20 is also provided on the opposite side of the device 10, which surface 20 is also a segment of a plane tangential to both the cylindrical surfaces 14, 16. Further guide surfaces 22 and 24 are provided which, together with splice support surfaces 18, 20, respectively, form segments of cylinders. Preferably, the cylinders of which the surfaces 22, 24 form a part have the same diameter as the cylinders of which surfaces 14, 16 form a part.

To provide lateral support for the optical fiber on the guide surfaces, a plurality of flange segments 26 are provided. Additionally, a plurality of resilient fingers 28 extend away from the splice support surfaces 18, 20. To provide structural rigidity, ribs 30 are provided inside the cylindrical surfaces 14, 16. The ribs 30 are joined by central hubs 32, each of which has a central bore 34 which may be utilized for securing the device 10 to a surface by means of screws or the like.

In operation, the splice cylinder 36 is pressed down between the resilient fingers 28 which are so spaced as to grip the splice cylinder 36. The optical fiber 38, 40 exiting from the splice cylinder 36 is then routed over the surfaces 14, 16, 22 and 24 so as to store all the excess cable and take up all slack. This may require a certain amount of creativity in finding an appropriate routing pattern, depending upon the length of the excess cable. Thus, such routing pattern can be oval, going around the outside of the surfaces 18, 14, 20 and 16. Alternatively, the routing pattern can be a figure eight pattern going around the cylindrical surfaces 14, 16 and crossing in between. Another possible routing pattern is an hourglass shape, going around the cylindrical surfaces 14 and 16 and against the surfaces 22 and 24. Another possible pattern is circular, going around one of the cylindrical surfaces 14 or 16. Other patterns, or combinations thereof, may be devised.

An advantage of the device 10 disclosed herein is that it maintains the fiber generally in a plane. Thus, a plurality of devices 10 can be stacked to accommodate a plurality of fibers.

Accordingly, there has been disclosed an improved optical fiber splice support and routing guide. While a preferred embodiment has been disclosed, it will be apparent to those skilled in the art that various modifications to the disclosed embodiment may be made and it is only intended that the scope of this invention be limited by the appended claims.

We claim:

1. An optical fiber splice support an routing guide comprising:
   a planar backing plate;
   a plurality of fiber guide surfaces perpendicular to said backing plate, each of said guide surfaces being configured so that a fiber supported thereon is maintained with a bend radius greater than a predetermined minimum radius, a first of said guide surfaces defining a first cylinder and a second of said guide surfaces defining a second cylinder spaced from said first cylinder;
   first splice support means for removably engaging and supporting a first splice between said supported fiber and another fiber including a first surface which defines a segment of a first plane tangential to both said first and second cylinders; and
   second splice support means for removably engaging and supporting a second splice including a second surface defining a segment of a second plane tangential to both said first and second cylinders.

2. The guide according to claim 1 further including a plurality of flange segments extending outwardly from said guide surfaces to provide lateral support for an optical fiber supported on said guide surfaces.

3. The guide according to claim 1 wherein each of said first and second splice support means includes a plurality of resilient fingers extending away from the respective splice support surface and so spaced as to grip a splice held therebetween.

4. An optical fiber splice support and routing guide comprising:
   a planar backing plate;
   a plurality of fiber guide surfaces perpendicular to said backing plate, each of said guide surfaces being configured so that a fiber supported thereon is maintained with a bend radius greater than a predetermined minimum radius, a first of said guide surfaces defining a first cylinder and a second of said guide surfaces defining a second cylinder spaced from said first cylinder; and
   splice support means for removably engaging and supporting a splice between said supported fiber and another fiber including a surface which defines a segment of a first plane tangential to both said first and second cylinders;
   a third of said guide surfaces defining, together with said splice support surface, a segment of a third cylinder.

5. The guide according to claim 4 further including a second splice support means which includes a surface defining a segment of a second plane tangential to both said first and second cylinders and a fourth of said guide surfaces defines, together with said second splice support surface, a segment of a fourth cylinder.

6. The guide according to claim 5 wherein said first, second, third and fourth cylinders have equal radii at least as great as said predetermined minimum radius.

7. The guide according to claim 4 further including a plurality of flange segments extending outwardly from said guide surfaces to provide lateral support for an optical fiber supported on said guide surfaces.

8. The guide according to claim 4 wherein said splice support means includes a plurality of resilient fingers extending away from said splice support surface and so spaced as to grip a splice held therebetween.

9. The guide according to claim 5 wherein each of said first and second splice support means is positioned between said first and second cylinders on opposite sides thereof and said third and fourth guide surfaces are positioned between said first and second planes.

* * * * *